(12) United States Patent
Jacobson et al.

(10) Patent No.: US 9,840,912 B2
(45) Date of Patent: Dec. 12, 2017

(54) DETERMINING CASING FLUID CAPTURE CROSS SECTION USING GAMMA COUNT RATE RATIO

(71) Applicant: HALLIBURTON ENERGY SERVICES, INC., Houston, TX (US)

(72) Inventors: Larry A. Jacobson, Richmond, TX (US); Weijun Guo, Houston, TX (US)

(73) Assignee: HALLIBURTON ENERGY SERVICES, INC., Houston, TX (US)

(*) Notice: Subject to any disclaimer, the term of this patent is extended or adjusted under 35 U.S.C. 154(b) by 0 days.

(21) Appl. No.: 15/328,449

(22) PCT Filed: Oct. 28, 2014

(86) PCT No.: PCT/US2014/062550
§ 371 (c)(1),
(2) Date: Jan. 23, 2017

(87) PCT Pub. No.: WO2016/068864
PCT Pub. Date: May 6, 2016

(65) Prior Publication Data
US 2017/0211382 A1    Jul. 27, 2017

(51) Int. Cl.
 G01V 5/10 (2006.01)
 E21B 49/08 (2006.01)
 E21B 49/00 (2006.01)
 G01V 13/00 (2006.01)

(52) U.S. Cl.
 CPC .............. *E21B 49/08* (2013.01); *E21B 49/00* (2013.01); *G01V 5/101* (2013.01); *G01V 13/00* (2013.01)

(58) Field of Classification Search
 CPC .......... G01V 5/10; G01V 5/102; G01V 5/104; G01V 5/105; G01V 5/126
 See application file for complete search history.

(56) References Cited

U.S. PATENT DOCUMENTS

| | | | | |
|---|---|---|---|---|
| 4,574,193 A * | 3/1986 | Arnold | ................ | E21B 47/1015 250/266 |
| 4,645,926 A * | 2/1987 | Randall | .................. | G01V 5/102 250/256 |
| 4,990,774 A * | 2/1991 | Smith, Jr. | .............. | G01V 5/107 250/266 |
| 5,900,627 A * | 5/1999 | Odom | .................... | G01V 5/104 250/269.6 |
| 6,005,244 A | 12/1999 | Vaeth et al. | | |
| 2010/0292927 A1 | 11/2010 | Jacobson et al. | | |

(Continued)

FOREIGN PATENT DOCUMENTS

WO      2013/158428      10/2013

OTHER PUBLICATIONS

PCT International Search Report and Written Opinion, dated Jul. 24, 2015, Appl No. PCT/US2014/062550, "Determining Casing Fluid Capture Cross Section Using Gamma Count Rate Ratio," Filed Oct. 28, 2014, 10 pgs.

*Primary Examiner* — Kiho Kim
(74) *Attorney, Agent, or Firm* — Gilliam IP PLLC

(57) ABSTRACT

A method, in some embodiments, comprises lowering a neutron wireline tool into a cased borehole containing casing fluid, determining a ratio of inelastic count rate to capture count rate using gammas passing through the casing fluid, and calculating a capture cross section of the casing fluid using the ratio.

20 Claims, 5 Drawing Sheets

(56) References Cited

U.S. PATENT DOCUMENTS

| | | | |
|---|---|---|---|
| 2013/0020075 A1* | 1/2013 | Chace | E21B 43/26 166/250.1 |
| 2013/0110404 A1 | 5/2013 | Moake | |
| 2014/0142856 A1 | 5/2014 | Guo et al. | |

* cited by examiner

DETERMINING CASING FLUID CAPTURE CROSS SECTION USING GAMMA COUNT RATE RATIO

BACKGROUND

Well logging is a technique used to identify characteristics of earth formations surrounding a borehole. The interrogation of a formation surrounding a borehole to identify one or more characteristics may employ sound, electrical current, electromagnetic waves, or high energy nuclear particles (e.g., gamma particles and neutrons). Receiving the interrogating particle or signal, and determining a formation property from such particle or signal, is in many cases a complex endeavor—one that is further complicated when properties of the surrounding borehole environment are unknown.

For instance, neutron wireline tools are often used to measure the capture cross sections and porosities of formations adjacent to the tools. The casing fluid within which a tool is disposed, however, can significantly skew these measurements, thereby rendering them inaccurate. Because these inaccurate measurements may then be used in any number of other production efforts, they can have significant financial and operational repercussions. If the casing fluid is properly identified, however, the measurements of a tool disposed in that casing fluid can be corrected to account for the casing fluid's effects. Accordingly, any method or system that efficiently and accurately identifies the casing fluid to aid in tool correction provides a competitive advantage in the marketplace.

BRIEF DESCRIPTION OF THE DRAWINGS

Accordingly, there are disclosed in the drawings and in the following description various methods and systems for determining a casing fluid capture cross section using a count rate ratio. In the drawings.

Figure 1:
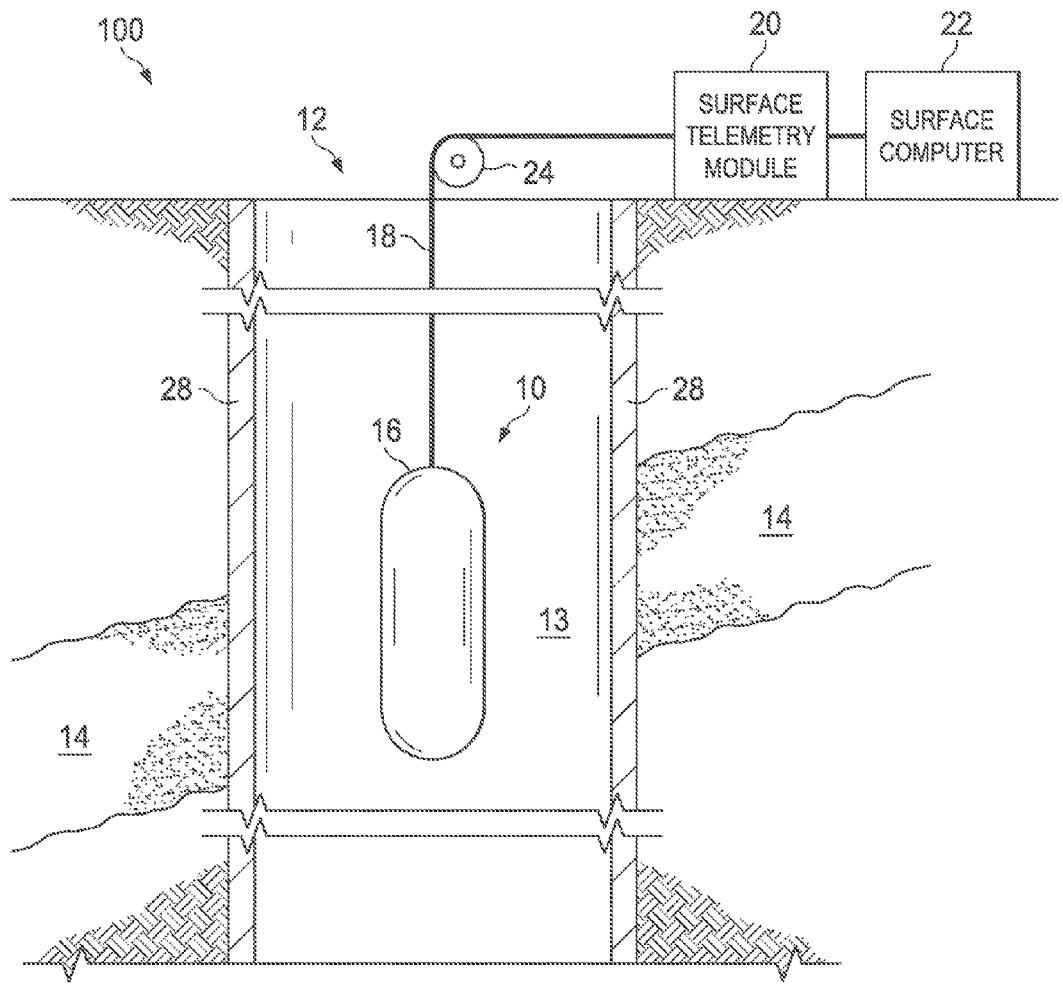
FIG. 1 is a schematic of a wireline system implementing the methods and systems disclosed herein, in accordance with embodiments.

It should be understood, however, that the specific embodiments given in the drawings and detailed description thereto do not limit the disclosure. On the contrary, they provide the foundation for one of ordinary skill to discern the alternative forms, equivalents, and modifications that are encompassed together with one or more of the given embodiments in the scope of the appended claims.

DETAILED DESCRIPTION

The various embodiments described below were developed in the context of wireline logging tools, and thus the description that follows is based on the developmental context; however, the various systems and methods find application not only in wireline logging tools, but also measuring-while-drilling (MWD) and logging-while-drilling tools (LWD). Further still, the various embodiments also find application in "slickline" tools and tubing-conveyed logging tools. Thus, the developmental context shall not be construed as a limitation as to the applicability of the various embodiments.

Disclosed herein are systems and methods to determine the capture cross section of casing fluid in a borehole using a gamma count rate ratio, which may then be used to correct measurements of downhole tools. A neutron source in a downhole tool emits neutrons, which experience inelastic collisions with nuclei of the casing fluid, borehole equipment, and surrounding formation. The inelastic collisions cause energy to be transferred from the neutrons to the nuclei with which they collide, and the nuclei subsequently emit energy in the form of inelastic gamma rays ("gammas"), while the neutrons continue onward through various subsequent scattering events in the fluid, downhole equipment, or formation. The neutrons eventually reach a reduced energy state, where they can be captured by nuclei. The capture collisions transfer energy to the nuclei, and the nuclei then emit energy in the form of capture gammas. Once emitted, the inelastic and capture gammas propagate through the fluid, equipment, and formation via various travel paths, with at least some of the travel paths passing primarily through the casing fluid. A gamma detector disposed a predetermined distance from the neutron source detects at least some of the inelastic gammas; the rate at which it detects these gammas is the inelastic count rate. The gamma detector also detects at least some of the capture gammas, and the rate at which it does so is the capture count rate. The ratio of the inelastic count rate to the capture count rate ("RIC") is directly related to the capture cross section of the casing fluid (commonly called "sigma casing fluid" and abbreviated as "$\sigma_{CF}$"). Specifically, the relationship between the $\sigma_{CF}$ and RIC has been found to fit the following equation:

$$\sigma_{CF} = A * \ln(RIC) + B \quad (1)$$

where A and B are coefficients that may be determined by performing Monte Carlo simulations of downhole environments similar to that in which the wireline tool is disposed, as described below. Once determined, the $\sigma_{CF}$ may be used to make various corrections to the tool measurements to account for the capture cross section of the casing fluid, thus improving tool accuracy. Examples of such corrections are available in Larry A. Jacobson, *Carbon/Oxygen Tool Response in Open Hole*, paper RR, SPWLA 46$^{th}$ Annual Logging Symposium, Jun. 26-29, 2005. Proper corrections require knowledge of casing fluid type (e.g., whether the fluid is oil or water).

FIG. 1 illustrates a nuclear logging system 100 in accordance with at least some embodiments. In particular, system 100 comprises a neutron wireline logging tool 10 placed within a borehole 12 proximate to a formation 14 of interest. The borehole 12 contains a casing string 28 and casing fluid 13, which may comprise one or more of oil, gas, fresh water, saline water, or other substances. The tool 10 comprises a pressure vessel 16 within which various subsystems of the tool 10 reside, and in the illustrative case of FIG. 1 the pressure vessel 16 is suspended within the borehole 12 by a cable 18. Cable 18, in some embodiments a multi-conductor armored cable, not only provides support for the pressure vessel 16, but also in these embodiments communicatively couples the tool 10 to a surface telemetry module 20 and a surface computer 22. The tool 10 may be raised and lowered within the borehole 12 by way of the cable 18, and the depth of the tool 10 within the borehole 12 may be determined by depth measurement system 24 (illustrated as a depth wheel).

Figure 2B:
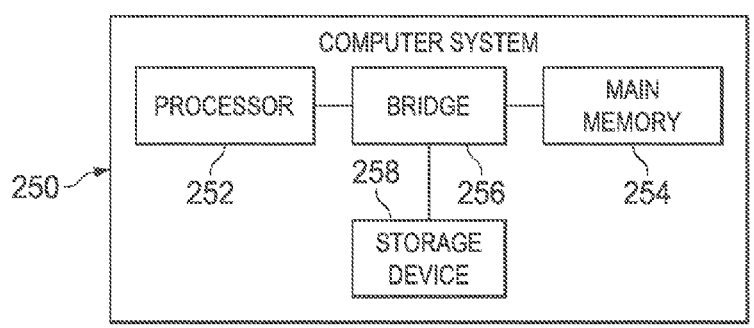
FIG. 2B is a schematic of a computer system in accordance with embodiments.
Figure 2A:
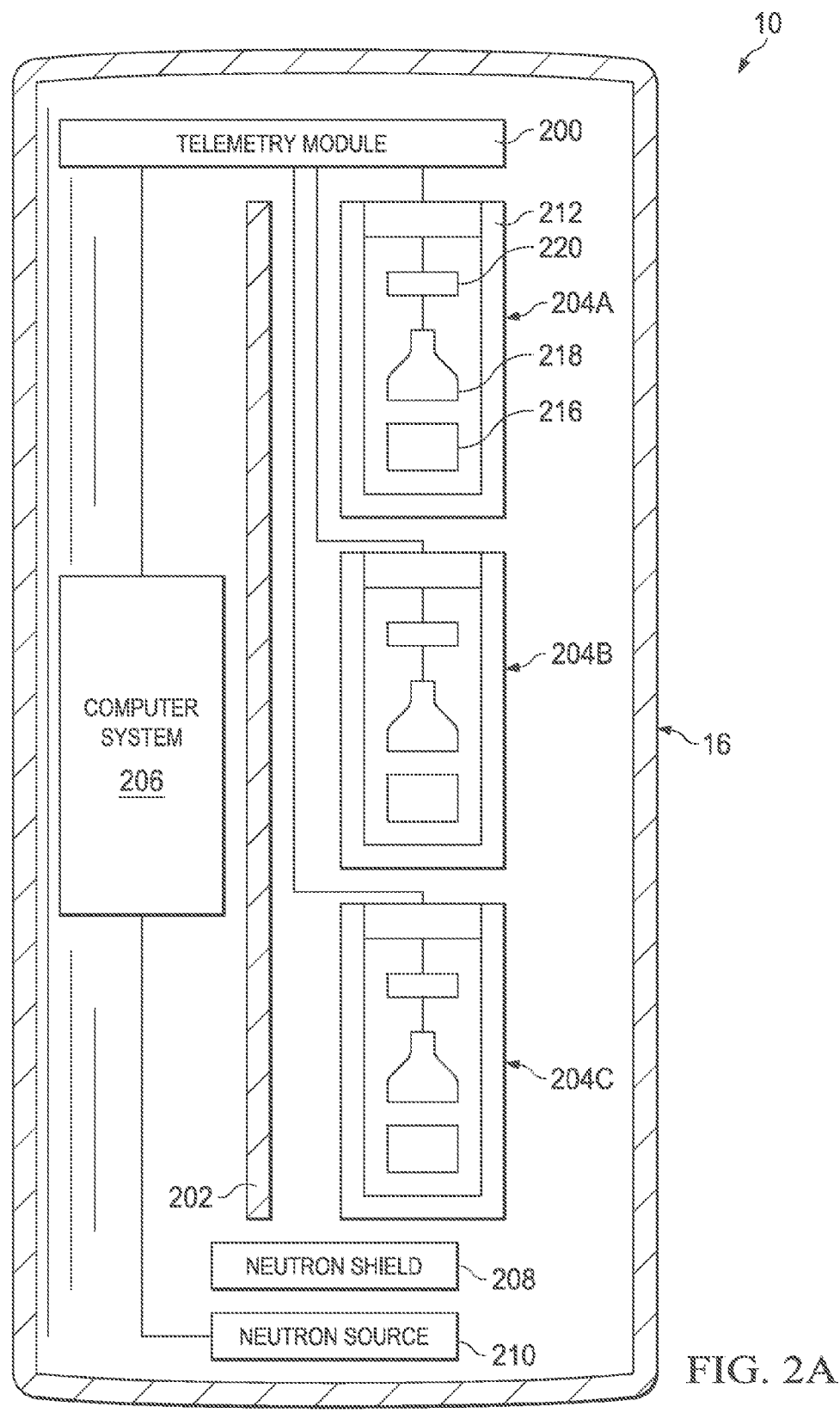
FIG. 2A is a simplified, cross-sectional schematic of a logging tool in accordance with embodiments.

FIG. 2A shows a simplified cross-sectional view of the logging tool 10 to illustrate the internal components in accordance with at least some embodiments. In particular, FIG. 2A illustrates that the pressure vessel 16 houses various components, such as a telemetry module 200, borehole shield 202, a plurality of gamma detectors 204 (in this illustrative case three gamma detectors labeled 204A, 2048 and 204C), computer system 206, a neutron shield 208 and a neutron source 210. While the gamma detectors 204 are shown above the neutron source 210, in other embodiments one or more of the gamma detectors may be below the neutron source. In at least some embodiments, gamma detector 204C (sometimes called the "near detector") may be disposed in the range from about 6 inches to 18 inches from neutron source 210. In at least some embodiments, gamma detector 204B (sometimes called the "far detector") may be in the range of 18 inches to 30 inches from the neutron source 210. The gamma detector 204A (sometimes called the "long detector") may be on the order of 32.5 to 36 inches from the neutron source 210. Other spacings may be used, however. Neutron shield 208 may be sized appropriately to make the gamma detectors 204 receive casing fluid- and/or formation-sourced gammas more favorably (as opposed to tool-sourced gammas), and the shield may be a high density material (e.g., HEVIMET® available from General Electric Company of Fairfield, Conn.).

In some embodiments, the neutron source 210 is a pulsed Deuterium/Tritium neutron generator. The neutron source 210, under command from surface computer 22 in the case of wireline tools, or computer system 206 within the tool in the case of MWD, LWD or slickline tools, generates and/or releases energetic neutrons in periodic bursts. In order to reduce the irradiation of the gamma detectors 204 and other devices by energetic neutrons from the neutron source 210, neutron shield 208 (e.g., HEVIMET®) separates the neutron source 210 from the gamma detectors 204. Because of the speed of the energetic neutrons (e.g., 30,000 kilometers/second or more), and because of collisions of the neutrons with atomic nuclei that change the direction of movement of the neutrons, a neutron flux is created around the logging tool 10 that extends into the casing fluid 13 and the formation 14.

Neutrons generated and/or released by the source 210 interact with atoms by way of inelastic collisions, elastic scattering and/or thermal capture. In the case of inelastic collisions, a neutron collides with an atomic nucleus and a gamma is emitted (an inelastic gamma) when the struck nucleus, having been raised to an excited state, decays. The energy of the neutron is also reduced accordingly. The neutron may have many inelastic collisions with the atomic nuclei, each time creating an inelastic gamma and losing energy. At least some of the gammas created by the inelastic collisions are incident upon the gamma detectors 204. One or both of the arrival time of a particular gamma and its energy may be used to determine status as an inelastic gamma. Further, when high-energy neutrons scatter with lighter earth elements, such as hydrogen, an elastic collision ensues and the energy loss by the neutron may be quite large, with the energy lost by the neutron being carried off by the recoiling nucleus. A neutron may continue to slow down and lose energy via one or more elastic collisions with light nuclei (which do not generate gammas) until it reaches thermal energy level.

After one or more inelastic and/or elastic collisions (and corresponding loss of energy), a neutron reaches an energy known as thermal energy (thereby becoming a thermal neutron). At thermal energy a neutron can be captured by atomic nuclei. In a capture event the capturing atomic nucleus enters an excited state and the nucleus later transitions to a lower energy state by release of a gamma (known as a thermal gamma or capture gamma). At least some of the capture gammas created by thermal neutron capture are also incident upon the gamma detectors 204. One or both of the arrival time of a particular gamma and its energy may be used to determine status as a capture gamma.

Still referring to FIG. 2A, when operational, the gamma detectors 204 detect arrival and energy of gammas. Referring to gamma detector 204A as indicative of all the gamma detectors 204, a gamma detector in some embodiments comprises an enclosure 212, and within the enclosure 212 resides: a crystal 216 (e.g., a one-inch by six-inch yttrium/gadolinium silicate scintillation crystal); a photo multiplier tube 218 in operational relationship to the crystal 216; and a processor 220 coupled to the photomultiplier tube 218. As gammas are incident upon/within the crystal 216, the gammas interact with the crystal 216 and flashes of light are emitted. Each flash of light itself is indicative of an arrival of a gamma, and the intensity of light is indicative of the energy of the gamma. The output of the photomultiplier tube 218 is proportional to the intensity of the light associated with each gamma arrival, and the processor 220 quantifies the output as gamma energy and relays the information to the surface computer 22 (FIG. 1) by way of the telemetry module 200 in the case of a wireline tool, or to the computer system 206 within the tool in the case of a MWD, LWD or slickline tool.

FIG. 2B illustrates in greater detail a computer system 250, which is illustrative of both the surface computer system 22 and the computer system 206 within the logging tool 10. Thus, the computer system 250 described with respect to FIG. 2B could be proximate to the borehole during the time period that the tool 10 is within the borehole, the computer system 250 could be located at the central office of the oilfield services company, or the computer system 250 could be within the logging tool 10 (such as for LWD or MWD tools). The computer system 250 comprises a processor 252, and the processor couples to a main memory 254 by way of a bridge device 256. Moreover, the processor 252 may couple to a long term storage device 258 (e.g., a hard drive) by way of the bridge device 256. Programs executable by the processor 252 may be stored on the storage device 258 and accessed when needed by the processor 252. The programs stored on the storage device 258 may comprise programs to implement the various embodiments of the present specification. In some cases, the programs are copied from the storage device 258 to the main memory 254, and the programs are executed from the main memory 254. Thus, both the main memory 254 and storage device 258 are considered computer readable storage media.

Figure 3:
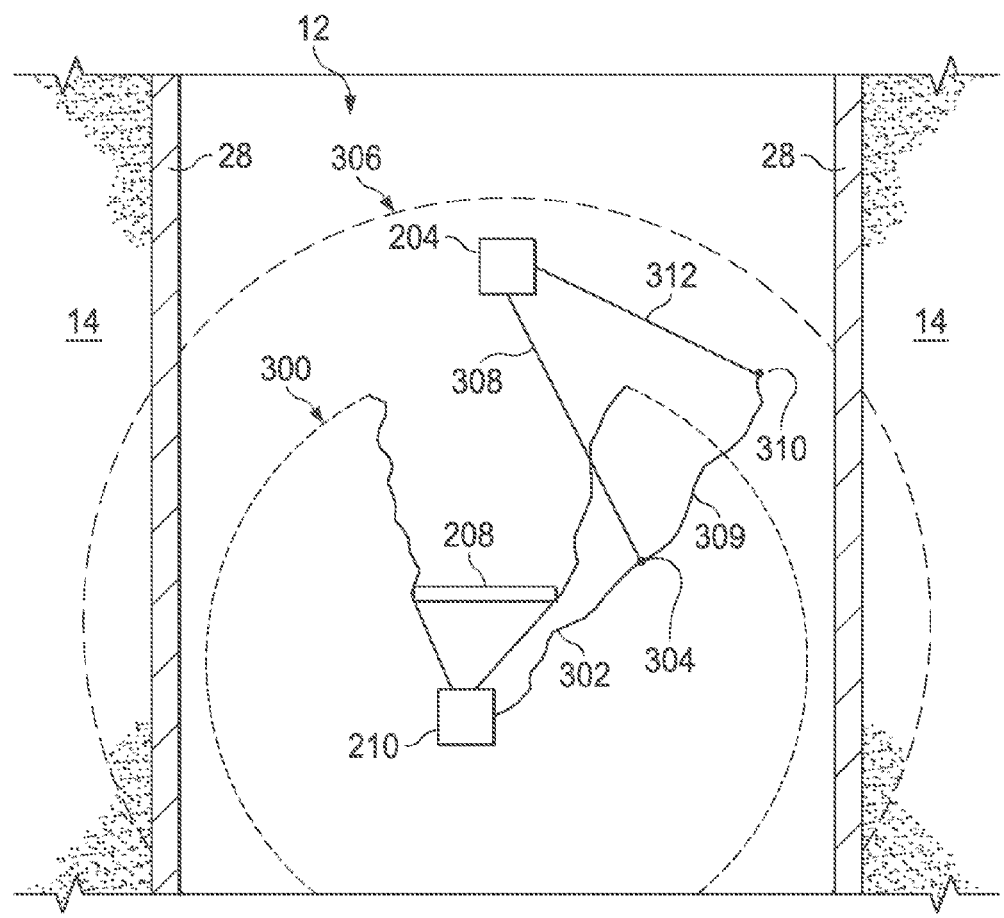
FIG. 3 is a graphic depicting inelastic and capture gamma paths to a detector and delineating differences in source volume for inelastic and capture gammas, in accordance with embodiments.

FIG. 3 shows a cross-sectional elevation view of a formation 14 penetrated by borehole 12. Within the borehole 12 are a neutron source 210 and a gamma detector 204, the gamma detector 204 illustratively at a predetermined distance above the neutron source 210. Generation and/or release of neutrons can be considered to create a roughly spherical inelastic gamma source volume 300 (shown in the cross-sectional view of FIG. 3 as a roughly circular region), and within the first source volume 300 inelastic gammas are created. Moreover, the generation and/or release of neutrons can be considered to create a spherical capture gamma source volume 306 (again shown in the cross-sectional view of FIG. 3 as a roughly circular region), and within the second source volume 306 capture gammas are created.

In illustrative systems, the neutron source 210 emits 14 MeV neutrons, and the neutrons go through scattering events until capture. The scattering events may give rise to the generation of gammas, which then propagate through the casing fluid and the formation, and some of the gammas are incident upon the detectors. Consider an illustrative neutron generated and/or released from the source 210. When generated and/or released from the source 210, an illustrative travel path for the neutron is represented by numeral 302. When a neutron scatters with a nucleus of heavier earth elements, such as oxygen, inelastic collisions with the nuclei may occur within the inelastic gamma source volume 300. Source volume 300 can be considered spherical for ease of conception; however, shape of the region in which gamma production by inelastic neutron scattering occurs need not necessarily be spherical and may vary in shape depending, for instance, on the composition of the casing fluid and the geometry of the pulsed neutron source 210. A spherical region might be expected for a substantially isotropic neutron source and medium. A neutron making an inelastic collision at 304, for example, loses energy to the struck nucleus. Although the neutron is depicted as undergoing an inelastic collision at 304, inelastic collisions occur throughout the source volume. As previously described, the struck nucleus emits the energy received from the neutron in the form of an inelastic gamma.

Some of the inelastic gammas reach the detector 204 and are tallied therein, with particular time and energy. That is, the flux of inelastic gammas is attenuated as the gammas propagate through the casing fluid (and, possibly, parts of the formation 14) such that only a portion of the gammas reach the detector 204. A gamma transmission efficiency model may be created that characterizes the attenuation, and in example cases the attenuation may be characterized by an exponential attenuation, such as shown by equation (2):

$$N_{inel}=A_{inel}e^{-\rho\mu L_{inel}} \quad (2)$$

where $N_{inel}$ is the inelastic count rate, $A_{inel}$ is a value indicative of the inelastic gammas in the source volume initially moving toward the detector, $\rho$ is casing fluid density, $\mu$ is the casing fluid mass attenuation coefficient, and $L_{inel}$ is the attenuation distance between the inelastic source region 300 and the detector 204. The attenuation distance may be schematically represented by the length of track 308 from source region 300 to detector 204.

Still referring to FIG. 3, a neutron having inelastically scattered off of constituent nuclei of the casing fluid and additionally lost energy via elastic collisions may scatter along path 309 until it undergoes thermal capture within the capture source volume 306, for example, at 310. Source volume 306 can be considered spherical for ease of conception; however, the shape of the region in which gamma production by neutron capture occurs need not necessarily be spherical and may vary in shape depending, for instance, on the composition of the casing fluid and the geometry of the pulsed neutron source. Moreover, source volume 306 in the illustrative situation subsumes inelastic source volume 300. Although the neutron is depicted as undergoing a capture collision at 310 in source volume 306, capture events can occur throughout the source volume 306, including within the source volume 300. The capture gamma emitted when the excited target nucleus decays also propagates through casing fluid 12 (and, possibly, formation 14), as schematically illustrated by track 312. Many gammas such as those marked by numerals 308 and 312 may be released within the casing fluid and detected by the detector 204, each representing the interaction between a corresponding neutron and a nucleus within the casing fluid. These gammas, once detected, may be used to characterize the casing fluid.

As with the inelastic gammas, a gamma transmission efficiency model for the capture gammas may be created that characterizes the attenuation as the gammas travel toward the detector, and in example cases the attenuation may be characterized by an exponential attenuation, such as shown by equation (3):

$$N_{cap}=A_{cap}e^{-\rho\mu L_{cap}} \quad (3)$$

where $N_{cap}$ is the capture count rate, $A_{cap}$ is a value indicative of the capture gammas in the source volume initially moving toward the detector, $\rho$ is casing fluid density, $\mu$ is the casing fluid mass attenuation coefficient, and $L_{cap}$ is the attenuation distance for capture gammas. The attenuation distance $L_{cap}$ may schematically be represented by the length of track 312 from source region 306 to detector 204.

Figure 4:
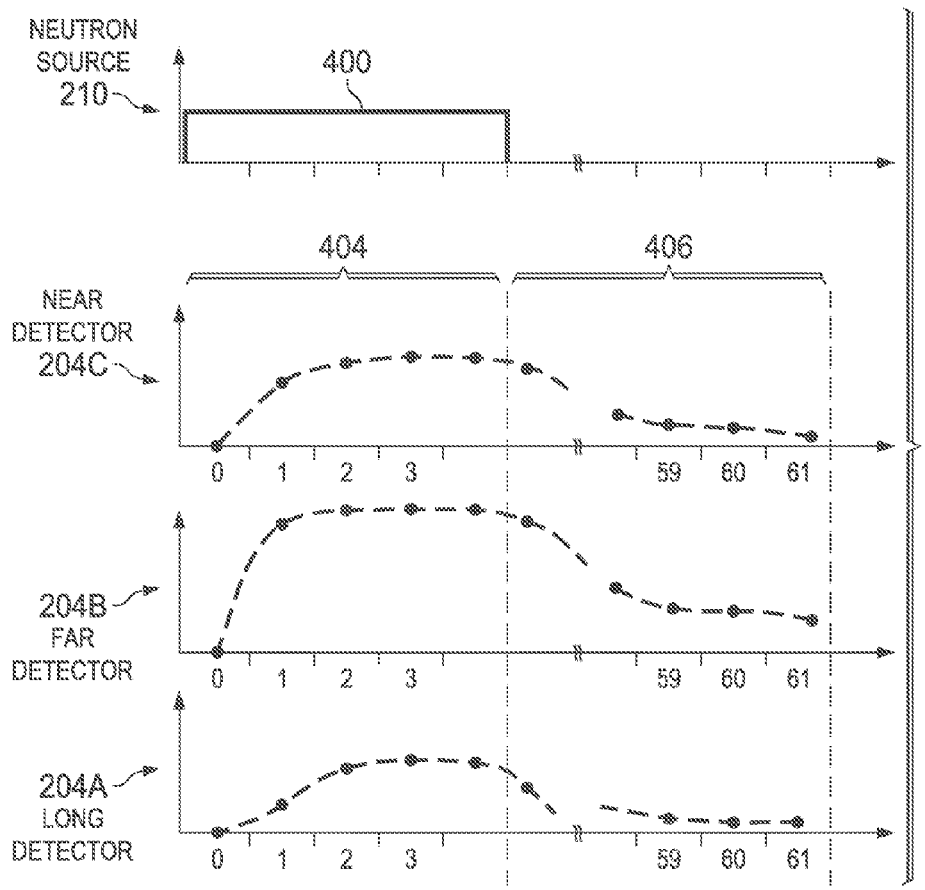
FIG. 4 is a set of graphs illustrating count rate as a function of time for multiple detectors, in accordance with embodiments.

The acquisition of gamma counts may be further understood by referring to FIG. 4, which depicts graphs of temporal histories of gamma fluxes at the three detectors 204A-C in FIG. 2 generated by a neutron pulse from the neutron source 210. The graphs qualitatively show the behavior in time of gammas incident on the respective detectors in accordance with at least some embodiments of the disclosure. In particular, FIG. 4 shows a graph relating to activation of the neutron source 210, as well as gamma count rates for the near detector 204C, the far detector 204B, and the long detector 204A. The graph with respect to the neutron source 210 is Boolean in the sense that it shows when the neutron source is generating and/or releasing neutrons (i.e., the burst period), and when the neutron source is not. In particular, with respect to the neutron source graph, the neutron source is generating and/or releasing neutrons during the asserted state 400, and the neutron source is off during the remaining time. In accordance with the various embodiments, a single interrogation (at a particular borehole depth) comprises activating the neutron source 210 for a predetermined amount of time (e.g., 80 microseconds) and counting the number of gamma arrivals by at least one of the detectors during the activation time of the neutron source 210 and for a predetermined amount of time after the source is turned off. In at least some embodiments, the total amount of time for a single interrogation (i.e., a single firing of the neutron source and the predetermined amount of time after the neutron source is turned off) may span approximately 1250 microseconds, but other times may be suitable.

Still referring to FIG. 4, with respect to counting gamma arrivals by the gamma detectors, the interrogation time is divided into a plurality of time slots or time "bins." With reference to the graph for the long detector 204A as illustrative of all the gamma detectors, in some embodiments the interrogation time is divided into 61 total time bins. In accordance with at least some embodiments, the first 32 time bins each span 10 microseconds, the next 16 time bins each span 20 microseconds, and the remaining time bins each span 50 microseconds. Other numbers of time bins and different time bin lengths may be equivalently used. For instance, in at least some embodiments, 125 bins each spanning 10 microseconds may be used. Each gamma that arrives within a particular time bin increases the count value of gammas within that time bin. While in some embodiments the actual arrival time of the gammas within the time bin may be discarded, in other embodiments the actual arrival may be retained and used for other purposes. Starting with time bin 0, the gamma detector counts the gamma arrivals and increases the count value for the particular time bin for each gamma arrival. Once the time period for the time bin expires, the system starts counting anew the arrivals of gammas within the next time bin until count values for all illustrative 61 time bins have been obtained. In some cases, the system starts immediately again by activating the neutron source and counting further time bins; however, the count values within each time bin (for a particular borehole depth) are recorded either by way of the surface computer 22 in the case of wireline tools, or by the computer system 206 within the tool in the case of a MWD, LWD or slickline tools.

Illustrative count values for each time bin are shown in FIG. 4 as dots in the center of each time bin. The count value for each time bin is represented by the height of the dot above the x-axis (i.e., the y-axis value). Taking all the count values for a particular detector together, the dots may be connected by a line (shown in dashed form in FIG. 4) illustrative of the number of gamma arrivals as a function of time detected by the particular gamma detector. In accordance with the various embodiments, the plurality of count values is referred to as a gamma count rate decay curve. All the curves taken together may be referred to as full-set decay curves.

Because of the physics of the logging tool, the casing fluid, and the surrounding formation, within certain time periods certain types of gammas are more likely to be created, and thus more likely to be counted by the one or more active gamma detectors 204. For instance, during the period of time within which the neutron source 210 is activated (as indicated by the line 400), the energy of neutrons created and/or released leads predominantly to creation of inelastic gammas. The period of time in the gamma count rate decay curve where the gammas are predominantly inelastic gammas is illustrated by time period 404. Thus, gammas counted during some or all of the time period 404 may be considered inelastic gammas. Some capture gammas may be detected during the time period 404, and in some embodiments the minority presence of capture gammas may be ignored. In yet still other embodiments, the portion of the count rate during time period 404 attributable to capture gammas may be removed algorithmically. And, further still, in other embodiments, the capture count during the time the neutron source is activated, which may also be termed the neutron burst period, may be estimated from the later capture count rate and projected back to the neutron burst period using relations known in the art.

Similarly, after the neutron source 210 is no longer activated, the average energy of the neutrons that make up the neutron flux around the tool 10 decreases, and the lower energy of the neutrons leads predominantly to creation of capture gammas. The period of time in the gamma count rate decay curves where the gammas are predominantly capture gammas is illustrated by time period 406. Thus, gammas counted during some or all of the time period 406 may be considered capture gammas.

The inelastic gamma counts of time period 404 and the capture gamma counts of period 406 may be converted to count rates by dividing each of the counts by a corresponding period of time. For instance, referring to time period 404 for near detector 204C, the total number of inelastic counts in the first three time bins (labeled as 1, 2 and 3 in FIG. 4) may be summed and then divided by three to determine a count rate. A ratio (abbreviated "RIC") of the inelastic count rate to the capture count rate is then determined by dividing the inelastic count rate by the capture count rate. Alternatively, the same ratio may be determined by dividing a number of inelastic counts by a number of capture counts, as long as the numbers of inelastic and capture counts are culled from the same time period. This ratio may be determined for each of the detectors 204A-C.

Referring briefly to FIG. 1, the capture cross section of the casing fluid 12 ($\sigma_{CF}$)—a probabilistic value that indicates how readily nuclei in the casing fluid will capture thermal neutrons—is a function of the RIC as determined using the near detector 204C. Specifically, the relationship between $\sigma_{CF}$ and RIC is expressed by the equation $$\sigma_{CF} = A^* \ln(RIC_{NEAR}) + B, \quad (4)$$

where $\sigma_{CF}$ is the capture cross section of the casing fluid and $RIC_{NEAR}$ is the ratio of the inelastic count rate to the capture count rate as determined using the near detector 204C and as described above. Generally, A and B are coefficients that are determined by generating one or more simulated downhole environments similar to the environment in which the tool 10 is disposed, using the simulations to plot a fitted curve describing the relationship between $\sigma_{CF}$ and $RIC_{NEAR}$ as those values vary in the simulated environment, and then using the fitted curve to identify coefficients A and B, which may then be used in equation (4).

Specifically, the simulations may be performed using any suitable downhole simulation software, such as software that performs Monte Carlo simulations (e.g., MCNP6 (Monte-Carlo neutron-photon) code, available from Radiation Safety Information Computation Center (RSICC), Oak Ridge, Tenn.). Such software typically permits the user to adjust numerous variables so as to simulate very specific environments. Variables that may be adjusted in such software and that also may impact the coefficients A and B include, without limitation, casing size, cement salinity, and the capture cross section of the formation (e.g., formation 14). These values may be chosen to most closely simulate the environment in which the tool 10 is disposed. Values such as casing size and cement salinity for the environment of tool 10 will already be known, and the value of the capture cross section of the formation adjacent to tool 10 (i.e., $\sigma_{FORMATION}$) is easily measured using the tool 10 using well-known techniques. Any number of simulations may be generated, each one varying one or more particular variables as may be deemed best to most closely simulate the actual environment in which tool 10 is disposed. A fitted curve best describing the relationship between $\sigma_{CF}$ and $RIC_{NEAR}$ across all such simulations may then be plotted.

Figure 5:
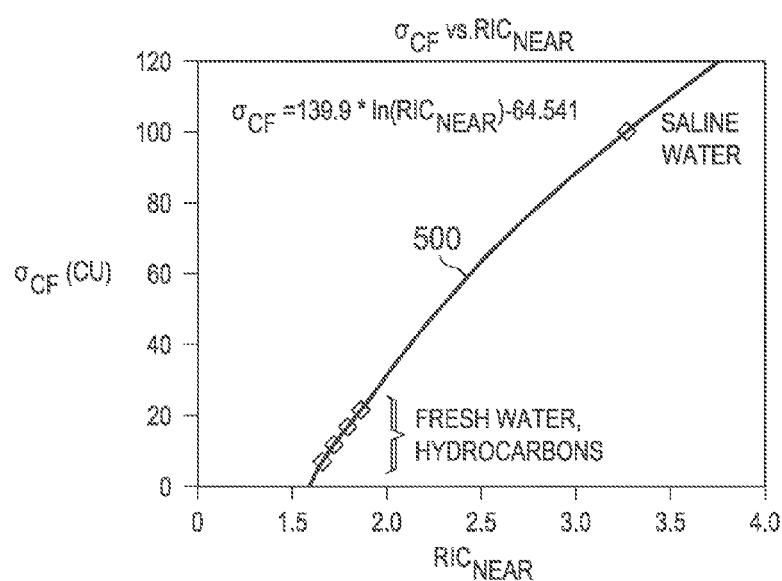
FIG. 5 is a plot of casing fluid cross section as a function of the ratio of inelastic count rate to capture count rate in a near detector, as modeled by simulation software, in accordance with embodiments.

FIG. 5 shows an illustrative fitted curve 500. The curve 500 describes the relationship between $\sigma_{CF}$ and $RIC_{NEAR}$ across multiple simulations. Simulations should be performed using a range of values for $RIC_{NEAR}$ so as to determine corresponding simulated $\sigma_{CF}$ values. In the example shown, as $RIC_{NEAR}$ increased in the simulation software for the particular environment that was simulated, the $\sigma_{CF}$ also increased. As shown, the fitted curve 500 is described by the equation $$\sigma_{CF} = 139.9^* \ln(RIC_{NEAR}) - 64.541 \quad (5)$$

where the values 139.9 and 64.541 are coefficients A and B from equation (4), respectively. Thus, equation (4) may be tailored for the real-world environment, the simulations of which produced coefficients A and B:

$$\sigma_{CF}=139.9*\ln(RIC_{NEAR})-64.541, \quad (4.1)$$

and after $RIC_{NEAR}$ is determined as described above, $\sigma_{CF}$ may be calculated using equation (4.1). Still referring to FIG. 5, a calculated value of $\sigma_{CF}$ reflects not only the capture cross section of the casing fluid, but also whether the casing fluid is saline water or a different fluid, such as freshwater or oil. As shown in the figure, casing fluids that are primarily saline water will tend to have $\sigma_{CF}$ values well above 22 capture units (CU), while most other fluids, such as fresh water and hydrocarbons, will have $\sigma_{CF}$ values in the vicinity of 22 CU or less. The casing fluid identity (e.g., whether the casing fluid is saline water or not) and $\sigma_{CF}$ enables corrections to be made to the tool 10—for instance, correcting parameters used to measure the capture cross section of formation 14, the porosity of the formation 14, and gas saturation. The corrected tool, when operated, measures such parameters with superior accuracy.

Figure 6:
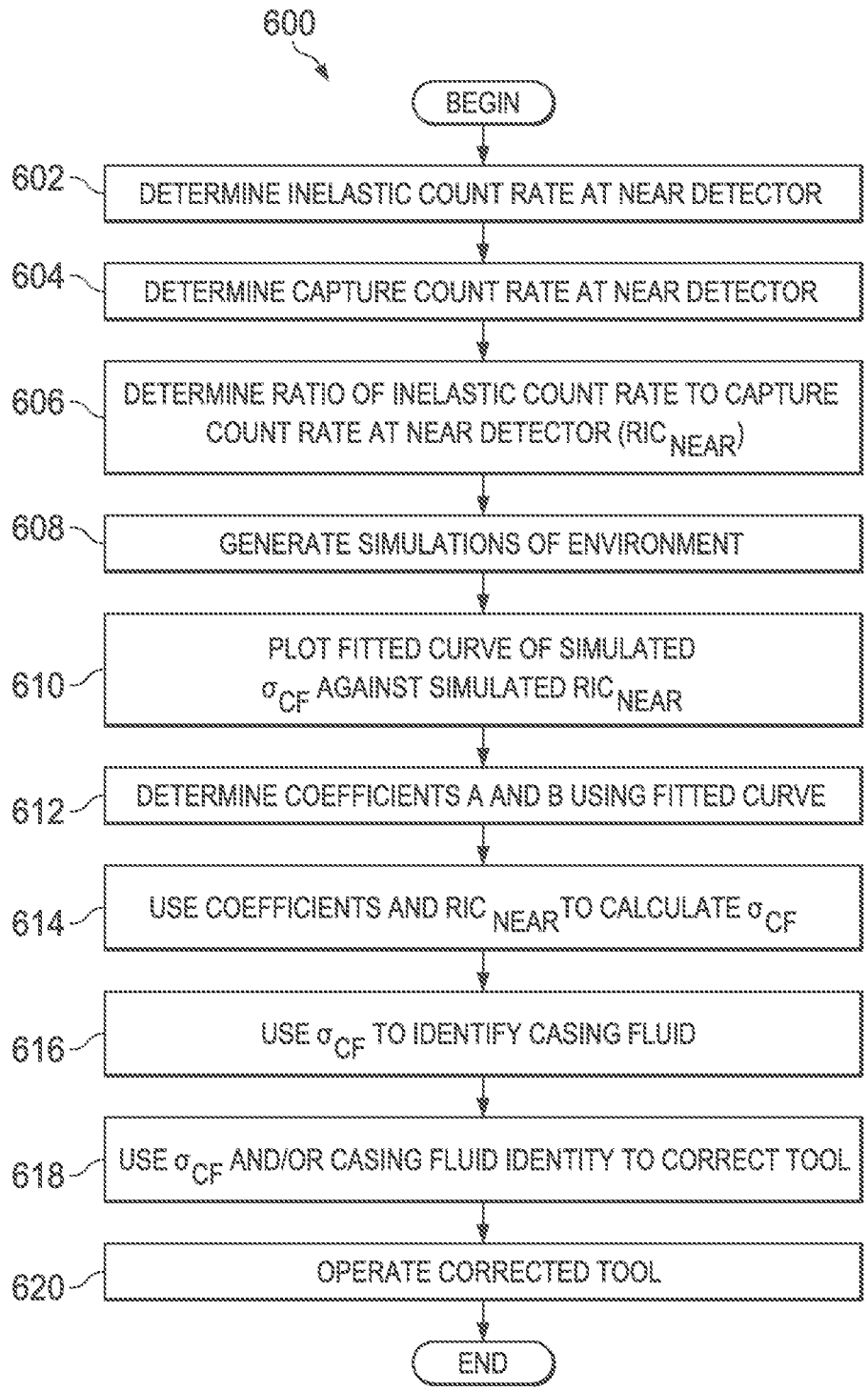
FIG. 6 is a flow chart describing a method implementing the techniques described herein, in accordance with embodiments.

FIG. 6 is a flow diagram of a method 600 usable to implement the techniques disclosed herein. The method 600 begins with determining an inelastic count rate at the near detector (step 602). The near detector is preferably used because it is, by definition, closest to the neutron source and is thus most sensitive to gamma activity in the casing fluid adjacent to the neutron source. This gamma activity helps best characterize the $\sigma_{CF}$ of the casing fluid. The method 600 then continues by determining the capture count rate at the near detector (step 604). The ratio of the inelastic count rate to the capture count rate ($RIC_{NEAR}$) is then calculated (step 606). The method 600 also comprises generating one or more simulations of the real-world downhole environment in which the neutron tool is disposed (step 608). A number of parameters may be varied to most closely simulate the real-world environment, including, without limitation, the casing size, cement salinity, and $\sigma_{FORMATION}$—each of which is known or can be measured. Additionally, any number of simulations may be performed. The method 600 further comprises plotting a fitted curve of the simulated $\sigma_{CF}$ against the simulated $RIC_{NEAR}$ (step 610). The coefficients A and B may then be determined using the fitted curve (step 612) and the coefficients may be used in tandem with $RIC_{NEAR}$ to calculate $\sigma_{CF}$ (step 614). The method 600 then comprises using $\sigma_{CF}$ to identify the casing fluid. As described above, a value significantly above 22 CU typically indicates a casing fluid that is primarily saline water, while a value in the vicinity of 22 CU or less typically indicates a casing fluid that is primarily not saline water. Finally, the method 600 comprises using the $\sigma_{CF}$ and/or identity of the casing fluid to correct the tool (step 618) and subsequently operating the corrected tool (step 620).

Numerous other variations and modifications will become apparent to those skilled in the art once the above disclosure is fully appreciated. For example, although some of the foregoing equations are expressed as logarithmic functions, all equivalent expressions—regardless of form (e.g., polynomials)—fall within the scope of the disclosure. It is intended that the following claims be interpreted to embrace all such variations, modifications and equivalents. In addition, the term "or" should be interpreted in an inclusive sense.

The following is claimed:

1. A method, comprising:
   lowering a neutron wireline tool into a borehole containing a casing fluid;
   determining a ratio of an inelastic count rate to a capture count rate using gammas passing through the casing fluid;
   calculating a capture cross section of the casing fluid using the ratio of the inelastic count rate to the capture count rate; and
   correcting a measurement by the neutron wireline tool based on the capture cross section of the casing fluid.

2. The method of claim 1 further comprising determining the inelastic count rate by counting inelastic gammas received during a finite period of time, the inelastic gammas produced by inelastic collisions between a neutron generated by the neutron wireline tool and a nucleus.

3. The method of claim 1 further comprising determining the capture count rate by counting capture gammas received during a finite period of time, the capture gammas produced by thermal capture collisions between a neutron generated by the neutron wireline tool and a nucleus.

4. The method of claim 1 further comprising:
   using simulation software to simulate one or more simulated downhole environments associated with an environment in which the neutron wireline tool is deployed;
   using the simulation software and the one or more simulated downhole environments to determine multiple coefficients; and
   wherein calculating the capture cross section of the casing fluid comprises calculating the capture cross section based on multiple coefficients.

5. The method of claim 4, wherein calculating the capture cross section of the casing fluid comprises determining the result of $A*\ln(RIC)+B$, where A and B are each one of the multiple coefficients and where RIC is the ratio of the inelastic count rate to the capture count rate.

6. The method of claim 5, wherein RIC is determined by a gamma detector disposed between 6 and 18 inches from a neutron source from which neutrons that act to produce the gammas are emitted.

7. The method of claim 4, wherein the coefficients are functions of a size of casing used in the borehole, salinity of cement used in the borehole, and a capture cross section of a formation adjacent to the borehole.

8. The method of claim 1, wherein correcting the measurement by the neutron wireline tool comprises correcting a parameter used to measure one or more of a capture cross section of a formation adjacent to the borehole, a porosity of the formation, and gas saturation.

9. A wireline tool system, comprising:
   a neutron source to generate neutrons;
   a gamma detector to receive inelastic gammas and capture gammas generated by collisions between the neutrons and nuclei, the gammas having passed through casing fluid within which at least part of the wireline tool system is disposed; and
   a non-transitory machine-readable medium comprising program code to,
      determine a capture cross section of a casing fluid based on a ratio of the rate at which the gamma detector detects the inelastic gammas to the rate at which the gamma detector detects the capture gammas, and
      correct a measurement by the wireline tool system based on the capture cross section of the casing fluid.

10. The wireline tool system of claim 9, wherein the gamma detector is disposed between 6 and 18 inches from the neutron source.

11. The wireline tool system of claim 9, wherein the program code comprises program code to determine the capture cross section of the casing fluid using the expression A*ln(RIC)+B, where A and B are coefficients and where RIC is the ratio.

12. The system of claim 9, wherein the program code to correct a measurement by the wireline tool system comprises program code to correct a parameter of the wireline tool system used to measure one or more of a capture cross section of a formation, a porosity of the formation, and gas saturation.

13. The wireline tool system of claim 9, wherein each of the gammas moves along a different travel path between its location of generation and the gamma detector, and wherein a majority of different travel paths is within the casing fluid.

14. The wireline tool system of claim 9, further comprising multiple other gamma detectors disposed axially along the tool, and wherein a distance between the gamma detector and the neutron source is less than a distance between any of the multiple other gamma detectors and the neutron source.

15. A method, comprising:
lowering a neutron wireline tool into a well containing a casing fluid, the neutron wireline tool housing a neutron source and a gamma detector;
using the neutron source to emit neutrons, at least some of the neutrons colliding with first nuclei and causing the first nuclei to produce inelastic gammas, and at least some of the neutrons colliding with second nuclei and causing the second nuclei to produce capture gammas;
determining an inelastic count rate based on a detection of inelastic gammas by the gamma detector, the inelastic gammas having passed through the casing fluid;
determining a capture count rate based on a detection of capture gammas by the gamma detector, the capture gammas having passed through the casing fluid;
determining a ratio of the inelastic count rate to the capture count rate;
determining a capture cross section of the casing fluid based on the ratio of the inelastic count rate to the capture count rate; and
correcting a measurement by the neutron wireline tool based on the capture cross section of the casing fluid.

16. The method of claim 15 further comprising:
generating a simulated model of a downhole environment associated with an environment in which the neutron wireline tool is disposed;
within said simulated model, determining a simulated model ratio of a simulated inelastic count rate to a simulated capture count rate;
within said simulated model, determining a simulated model casing fluid capture cross section; and
determining coefficients usable to express the simulated model casing fluid capture cross section as a function of the simulated model ratio;
wherein determining the capture cross section of the casing fluid comprises calculating the capture cross section of the casing fluid based on the coefficients and the ratio of the inelastic count rate to the capture count rate.

17. The method of claim 16, wherein calculating the capture cross section of the casing fluid comprises using the result of A*ln(RIC)+B, where A and B are each one of the coefficients, and where RIC is the ratio of the inelastic count rate to the capture count rate.

18. The method of claim 16, wherein the coefficients are functions of a size of casing used in the well, salinity of cement used in the well, and capture cross section of a formation adjacent to the well.

19. The method of claim 15, wherein correcting the measurement by the neutron wireline tool comprises correcting a parameter of the neutron wireline tool associated with measuring one or more of a capture cross section of a formation, a porosity of the formation, and gas saturation.

20. The method of claim 15, further comprising determining the inelastic count rate by counting inelastic gammas received during a finite period of time, the inelastic gammas produced by inelastic collisions between a neutron generated by the neutron wireline tool and a nucleus.

\* \* \* \* \*